June 14, 1966   A. M. NERVO   3,255,717
METHOD OF MAKING INDIVIDUAL BREAD LOAVES FROM A MULTIPLE LOAF
Filed Nov. 29, 1962   2 Sheets-Sheet 1

ALPHONSE M. NERVO
INVENTOR.

ATTORNEY

June 14, 1966    A. M. NERVO    3,255,717
METHOD OF MAKING INDIVIDUAL BREAD LOAVES FROM A MULTIPLE LOAF
Filed Nov. 29, 1962    2 Sheets-Sheet 2

ALPHONSE M. NERVO
INVENTOR.

ATTORNEY

United States Patent Office 3,255,717
Patented June 14, 1966

3,255,717
METHOD OF MAKING INDIVIDUAL BREAD
LOAVES FROM A MULTIPLE LOAF
Alphonse M. Nervo, Long Island City, N.Y., assignor of one-ninth to Julius Gruber, Rockville Centre, N.Y., one-ninth to Marvin H. Bergman, Queens County, N.Y., and one-ninth to Donald R. Manes, Jericho, N.Y.
Filed Nov. 29, 1962, Ser. No. 240,785
1 Claim. (Cl. 107—54)

This invention relates to the baking of bread in loaves, and is particularly directed to a primary loaf of bread, which is baked in a relatively large unit, and cut to the size required for individual loaves after baking, and the method of baking and otherwise processing the multiple loaf.

In the conventional method of baking bread, the dough required for an individual loaf is placed in a pan or other container and baked for a predetermined period, and at the required temperature.

When the baking is completed, the individual loaf is removed from the pan and wrapped in a wrapping machine, either sliced or unsliced.

When the individual loaf is removed from the baking pan, the crust at the top is of irregular contour, the sides and bottom of the loaf also having varying thicknesses of crust formed thereon.

The primary feature of applicant's invention is that a large primary loaf is baked in an individual pan, the large loaf being divided into individual loaves of substantially conventional size after baking.

Another feature is that the individual loaves, after slicing and trimming are of uniform size and entirely free of crust, thus reducing waste to a minimum.

Another feature of the invention is that the time of baking per individual loaf is sharply reduced over that required for baking the same number of individual loaves.

Another feature is that the primary loaf is baked at a lower temperature than the conventional type of bread loaf, thereby reducing the amount of fuel required for baking the individual loaf.

Another feature is that the space occupied by the primary loaf in an oven during baking is sharply reduced over that required for baking a similar number of individual loaves, the amount of heat and fuel required also being sharply reduced.

Another feature is that the composition of the individual loaf cut out of a primary loaf is relatively uniform, variations in composition in individual loaves being reduced to a minimum.

Another feature is that in the slicing of individual loaf sections out of a primary loaf, using a multiple bladed slicing machine in one direction, and a second multiple bladed slicing machine in a direction perpendicular to the blades of the first machine, the blades of the second machine being varied in spacing relative to those of the first slicing machine.

Another feature is that the crust surrounding the front, rear and side walls of the primary loaf is removed during the process of slicing.

Another feature is that each individual loaf section is sliced in the conventional type of slicing machine, after it is cut out of the primary loaf, the top and bottom crust at both ends of each individual loaf section being removed during the process of slicing the individual loaf section.

A major feature of the invention, is that the slices cut out of the individual loaf section are of uniform size, texture and composition, all crust having been entirely removed during the slicing process.

The accompanying drawings, illustrative of one embodiment of my invention, and a modification thereof, together with the description of their composition and the method of baking, processing and utilization thereof, will serve to clarify further objects and advantages of the invention.

Figure 1:
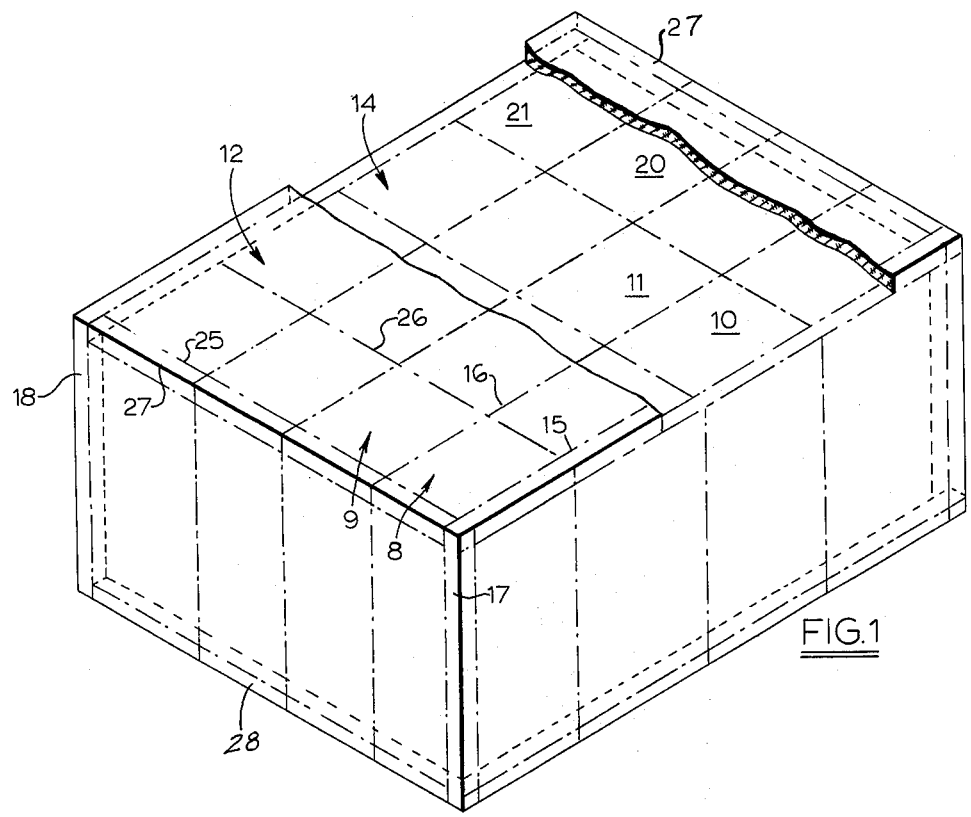
FIG. 1 is an isometric view of the multiple loaf, showing the individual sectional loaves into which it is sliced, and the thicknesses of crust surrounding the outer surfaces of the primary loaf.

It will be understood that the following description of the baking, processing and the method of preparing and utilization of the primary bread loaf divided into a series of individual sectional loaves and method of processing thereof is intended as explanatory of the invention and not restrictive thereof.

In the drawings, the same reference numerals designate the same parts throughout the various views, except where otherwise indicated.

One embodiment of the multiple loaf construction shown in FIG. 1, represents a relatively large primary loaf of bread, which is slightly greater in height than the length of the conventional loaf of bread. The depth of the primary loaf along the side face thereof is substantially equal to the width of four conventional bread loaves plus two thicknesses of crust at the two ends thereof. The width of the front face of the primary loaf is substantially equal to the normal height of four conventional loaves of bread, plus two thicknesses of crust at the two ends of the primary loaf.

The primary loaf is baked in the conventional manner, in a pan or other suitable utensil to control the dimensions of the bottom of the loaf, the front and rear faces and the sides of the primary loaf being tapered slightly, the bottom being somewhat narrower and shorter than the top thereof to provide draft to facilitate removal of the primary loaf from the pan after baking.

The composition of the dough used in preparing the primary loaf shown in FIG. 1, is substantially the same as that used in baking the conventional loaf of bread of the same type.

The exact composition would depend upon the type of bread desired, the weight or volume of dough being controlled by the dimensions of the finished primary loaf, provision being made for expansion or growth in volume due to baking, as is well known in the art.

The length and width of the primary loaf would be determined by the size of the oven space available, or by convenience of handling after baking in a manner hereinafter described. In the primary loaf shown in FIG. 1, the primary loaf is divided into four longitudinal rows 8, 9, of individual loaf sections 10, 11, the longitudinal rows being divided into four cross rows 12, 14 of individual loaf sections, thereby providing a total of sixteen individual sectional loaves of bread, the height of each of which is substantially equal to or slightly greater than the length of the conventional loaf of bread.

The temperature of baking the primary loaf is reduced over that used in baking the individual loaf, the time of baking being increased due to the greater depth and consequently greater heat penetration required with the primary loaf, in order to obtain uniform heat penetration, and uniform texture throughout.

After the primary loaf is baked in a manner and for the length of time hereinafter described, and allowed to cool, it is placed in a multiple bladed slicing machine, the spacing between the blades being substantially equal to the corresponding dimensions of the individual sectional loaves 10, 11.

Although the slicing procedure is optional, the primary loaf may first be sliced along four longitudinal lines 15, 16, such as those shown in FIG. 1, thus dividing the primary loaf into four longitudinal rows 8, 9 of individual loaf sections, and two thicknesses of crust 17, 18 which are removed from the front and rear faces of the primary loaf.

After the slicing along the longitudinal rows is completed, the primary loaf, with the two thicknesses of crust 17, 18 removed therefrom, is placed in a second slicing machine, or the blades of the first slicing machine may be respaced and realigned to conform to the longitudinal length of each of the individual loaf sections 10, 11.

Figure 4:
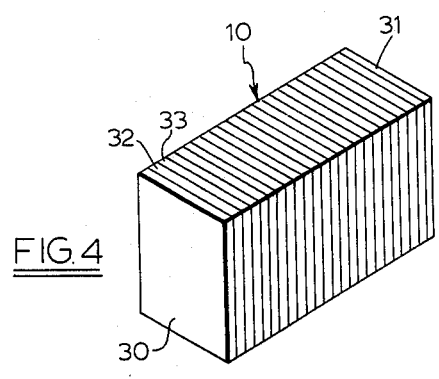
FIG. 4 shows one individual sectional loaf, such as those shown in FIGS. 1 and 2 after the sectional loaf is cut into slices, with the crust sections indicated at the ends of the individual sectional loaf.

The blades of the second slicing machine cut the rows of loaf sections into individual loaf sections 10, 11, 20, 21, by slicing along the five cross lines 25, 26, thereby dividing the primary loaf into a total of sixteen individual loaf sections 10, 11 and leaving two end crust layers 27, 28 on the ends of the loaf section, as shown in FIG. 1. This leaves each of the sixteen individual loaf sections with a crust section 30, 31 at each end thereof, as shown in FIG. 4.

While shown and described as being divided into four rows of four loaf sections each in each direction, or a total of sixteen loaf sections, the number of loaf sections into which the primary loaf is divided may be increased or decreased, depending upon the overall size of the primary loaf section or the size of the primary loaf which can be conveniently handled during the slicing operations hereinbefore described.

The number of loaf sections in each cross-row may be equal to, greater or less than the number of loaf sections in each longitudinal row, depending upon the dimensions of the primary loaf selected.

This would also depend to some extent upon the length of the blades in the slicing machine used, and the number of blades with which a particular slicing machine is equipped, and the platform or slicing area of the slicing machine employed.

After the individual loaf sections 10, 11, 20, 21 are removed from the primary loaf shown in FIG. 1, each loaf section is placed in a conventional bread slicing machine in which it is sliced into a plurality of individual slices 32, 33 as shown in FIG. 4, the number of slices depending upon the length of each individual loaf section, and the thickness of the individual slices, the slicing machine also removing two crust sections 30, 31 from the ends thereof, the crust sections representing parts of the top and bottom crust layers 27, 28 of the primary loaf shown in FIG. 1.

After slicing, the individual loaf section with the crust 30, 31 removed from the ends thereof, is wrapped in the conventional wrapping machine.

Figure 2:
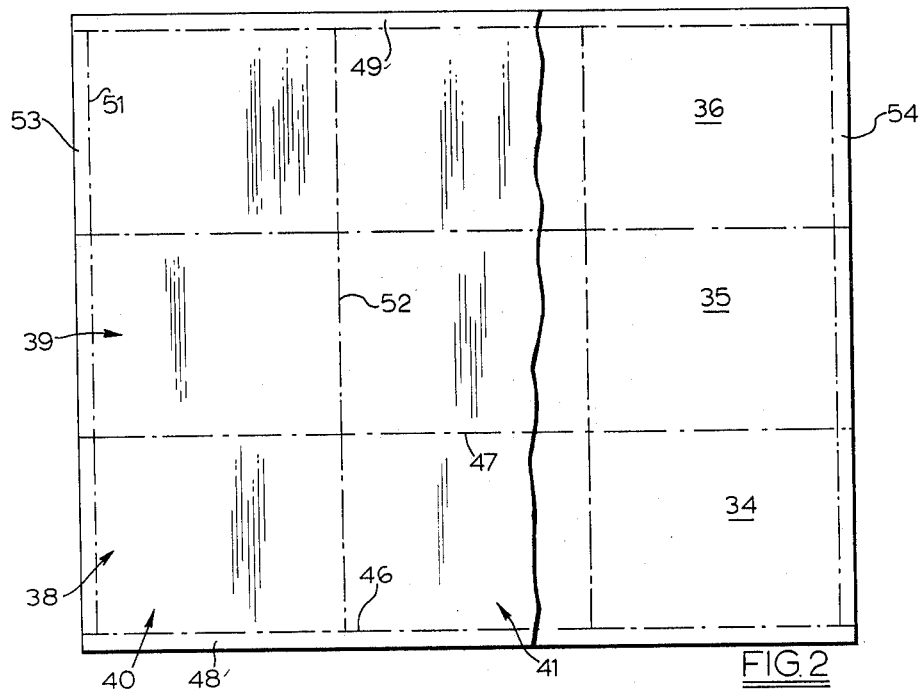
FIG. 2 is a plan view of a modification of the primary loaf shown in FIG. 1 with a portion of the top layer of crust removed, showing the slicing lines dividing the primary loaf into individual sectional loaves, and for removing the crust from portions of the primary loaf.
Figure 3:
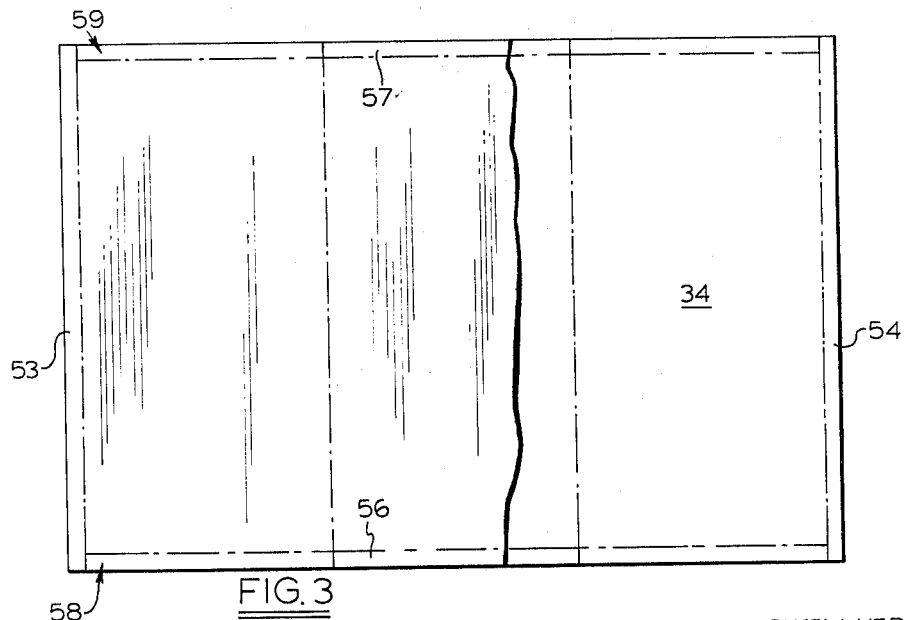
FIG. 3 is a front elevational view of the primary loaf shown in FIG. 2, with a portion of the front layer of crust removed, showing the lines dividing the primary loaf into individual sectional loaves.

A modification of the primary loaf is shown in FIGS. 2 and 3.

The only difference between the primary loaf shown in FIG. 1, and the modified primary loaf shown in FIGS. 2 and 3, is that the primary loaf shown in FIGS. 2 and 3 is considerably smaller, the modified primary loaf being divided into a total of nine individual loaf sections 34, 35, 36, the dimensions of each individual loaf section being substantially the same as those shown in FIGS. 1 and 4.

The overall height of the primary loaf shown in FIG. 3 is substantially the same as that shown in FIG. 1, the height of each individual loaf section being equal to or slightly greater than the length of the conventional type of individual bread loaf of comparable size.

The baking, and processing of the primary loaf shown in FIGS. 2 and 3, and the composition thereof, are substantially the same as that shown in FIG. 1, except that the length and width of the modified primary loaf shown in FIGS. 2 and 3 are considerably smaller than those shown in FIG. 1, the primary loaf being divided into a total of nine individual loaf sections 24, 25, 26, each of which is substantially the same as those shown in FIG. 1, as contrasted with the sixteen individual loaf sections, shown in FIG. 1.

After baking and processing in a manner similar to that shown in FIG. 1, and hereinbefore described, the primary loaf is allowed to cool.

In the modified primary loaf shown in FIG. 2, the primary loaf is divided into three longitudinal rows 38, 39 of individual loaf sections, the longitudinal rows being divided into three cross-rows 40, 41 of individual loaf sections, thereby providing a total of nine individual sectional loaves 34, 35, 36 of bread, the height of each of which is substantially equal to that shown in FIGS. 1 and 4.

After the primary loaf is baked and allowed to cool, it is placed in a multiple bladed slicing machine, the spacing between adjoining blades being substantially equal to the corresponding dimensions of the individual sectional loaf shown in FIG. 4.

The primary loaf may first be sliced along four longitudinal lines 46, 47, such as those shown in FIG. 2, thus dividing the primary loaf into three longitudinal rows 38, 39 of individual loaf sections, and two thin sections of crust 48, 49, which are removed from the front and rear faces of the primary loaf.

After the slicing into the longitudinal rows is completed, the primary loaf, with the two thickness of crust removed, is placed into a second slicing machine or a respaced slicing machine, the spacing between individual blades of which is equal to the longitudinal length of each of the individual loaf sections 34, 35, 36.

The blades of the second slicing machine cut the rows of loaf sections into individual loaf sections by slicing the longitudinal rows of loaf sections along four cross-lines 51, 52, thereby dividing the primary loaf into a total of nine individual loaf sections 34, 35, 36, and two end crust layers 53, 54, as shown in FIGS. 2 and 3. This leaves each of the nine individual loaf sections with a crust section 56, 57, at each end thereof, as shown in FIG. 4.

While shown and described as being divided into a total of nine individual loaf sections, the modified construction shown in FIGS. 2 and 3 may be divided into either a greater or smaller number of individual loaf sections, depending upon the overall size of the primary loaf and the size of the primary loaf which can conveniently be handled for slicing and the other operations, subsequent to baking.

Thus the number of longitudinal rows of individual loaf sections may be equal to, or greater or less than the number of cross-rows, the exact number depending upon the overall dimensions of the primary loaf.

The dimensions of each individual sectional loaf may also be varied, depending upon the size of the finished individual sectional loaf desired, thus correspondingly altering the dimensions of the primary loaf.

After the individual loaf sections 34, 35, 36 are removed from the primary loaf shown in FIG. 2, each loaf section is placed in a bread slicing machine and sliced in the same manner as that shown in FIG. 4 and hereinbefore described. During the slicing process two crust sections 56, 57 are removed from the ends of each individual loaf section, the crust sections representing parts of the top and bottom crust layers 58, 59 of the modified primary loaf shown in FIGS. 2 and 3.

After slicing, the individual loaf section, with the crust 56, 57 removed from the ends thereof is wrapped in waxed paper, cellophane, or other suitable protective material in the conventional wrapping machine.

It will be apparent to those skilled in the art that my present invention is not limited to the specifc details described above and shown in the drawings, and that various modifications are possible in carrying out the features of the invention and the fabrication, processing, and the method of utilization thereof, without departing from the spirit and scope of the appended claim.

What I claim is:

The method of making individual bread loaves from a multiple bread loaf, the length of said multiple bread loaf being somewhat greater than the corresponding dimension of a plurality of individual bread loaves, the width of said multiple bread loaf being somewhat greater than the corresponding dimension of a plurality of individual bread loaves, the height of the multiple bread loaf being somewhat greater than the length of an individual bread loaf, the method comprising placing a predetermined quantity of dough of a preselected composition into an open pan, the inner length of said open pan being substantially equal to the length of the baked multiple loaf, the inner width of said pan being substantially equal to the width of the baked multiple loaf, baking said dough at a preselected temperature over a predetermined time interval sufficient to bake said multiple loaf, allowing said baked multiple loaf to cool, slicing said multiple loaf along a direction substantially parallel to one face of the multiple loaf to divide the multiple loaf into a plurality of rows of individual loaf sections, removing a relatively thin layer of crust from the multiple loaf at each end thereof parallel to the rows of loaf sections, slicing the rows of individual loaf sections into a plurality of individual loaves removing a relatively thin layer of crust from each end of each row of loaf sections and before slicing the baked multiple loaf removing it from said pan.

References Cited by the Examiner

UNITED STATES PATENTS

| 203,363 | 5/1878 | Muth | 99—86 |
| 1,929,358 | 10/1933 | Keefer | 99—86 |
| 1,973,926 | 9/1934 | McCarthy | 99—86 |
| 2,111,910 | 3/1938 | Fisher | 99—83 |
| 2,179,672 | 11/1939 | Roys | 99—173 |

OTHER REFERENCES

Betty Crocker's Picture Cook Book, 1st edition, 1950, McGraw-Hill Book Co., Inc., New York; page 26 relied on.

A. LOUIS MONACELL, *Primary Examiner.*

R. N. JONES, *Assistant Examiner.*